(12) United States Patent
Wilson et al.

(10) Patent No.: US 12,026,464 B2
(45) Date of Patent: *Jul. 2, 2024

(54) SYSTEM AND METHOD FOR IMPROVED ADDRESS ENTRY

(71) Applicant: Malikie Innovations Limited, Dublin (IE)

(72) Inventors: Nicholas Bryson Wilson, Ottawa (CA); Robert Joseph Alain Guay, Gatineau (CA); Sherif Aly Abdel-Kader, Waterloo (CA)

(73) Assignee: Malikie Innovations LImited, Dublin (IE)

( * ) Notice: Subject to any disclaimer, the term of this patent is extended or adjusted under 35 U.S.C. 154(b) by 31 days.

This patent is subject to a terminal disclaimer.

(21) Appl. No.: 16/241,325

(22) Filed: Jan. 7, 2019

(65) Prior Publication Data

US 2019/0155897 A1 May 23, 2019

Related U.S. Application Data

(63) Continuation of application No. 12/394,873, filed on Feb. 27, 2009, now Pat. No. 10,176,162.

(51) Int. Cl.
*G06F 17/00* (2019.01)
*G06F 3/023* (2006.01)
(Continued)

(52) U.S. Cl.
CPC .......... *G06F 40/274* (2020.01); *G06F 3/0237* (2013.01); *G06Q 10/107* (2013.01)

(58) Field of Classification Search
CPC ... G06Q 10/107; G06F 40/274; G06F 3/0237; G06F 40/247
(Continued)

(56) References Cited

U.S. PATENT DOCUMENTS 5,845,300 A 12/1998 Comer et al.
5,896,321 A 4/1999 Miller et al.
(Continued)

OTHER PUBLICATIONS

Glick, J.: Autocomlete Addressing: Mach V/Mozilla: Mail & News; created Sep. 2001; modified Aug. 2003; retrieved from www.mozilla.org/mailnews/specs/autocomplete on Jun. 29, 2007.
(Continued)

*Primary Examiner* — Manglesh M Patel
(74) *Attorney, Agent, or Firm* — Conley Rose, P.C.; J. Robert Brown, Jr.

(57) ABSTRACT

An improved system and method for address entry are provided for a user to enter a plurality of addresses into a recipient field associated with an electronic communication. According to embodiments described herein, a first user input is received. The first user input is indicative of a first recipient for an electronic communication, where the first recipient includes a first name and a last name. A second user input is received in addition to the first recipient while the electronic communication is currently addressed to the first recipient. The second user input is indicative of a portion of a second recipient for the electronic communication. An auto-complete list of one or more suggested recipients that correspond to the second user input is displayed while the electronic communication is currently addressed to the first recipient. The one or more suggested recipients do not include the first recipient.

6 Claims, 9 Drawing Sheets

(51) Int. Cl.
*G06F 40/274* (2020.01)
*G06Q 10/107* (2023.01)

(58) Field of Classification Search
USPC .............................. 715/255–256, 261, 221
See application file for complete search history.

(56) References Cited

U.S. PATENT DOCUMENTS

| | | | |
|---|---|---|---|
| 6,208,339 B1 | 3/2001 | Atlas et al. | |
| 6,279,016 B1 | 8/2001 | De Vorchik et al. | |
| 6,349,299 B1 | 2/2002 | Spencer et al. | |
| 6,377,965 B1 | 4/2002 | Hachamovitch et al. | |
| 6,564,213 B1 | 5/2003 | Ortega et al. | |
| 6,751,603 B1 | 6/2004 | Bauer et al. | |
| 6,829,607 B1 | 12/2004 | Tafoya et al. | |
| 6,879,691 B1 | 4/2005 | Koretz | |
| 6,952,805 B1 | 10/2005 | Tafoya et al. | |
| 7,117,451 B2 | 10/2006 | Sielken | |
| 7,181,497 B1 | 2/2007 | Appelman et al. | |
| 7,185,271 B2 | 2/2007 | Lee et al. | |
| 7,343,551 B1 | 3/2008 | Bourdev | |
| 7,466,859 B2 | 12/2008 | Chang et al. | |
| 7,587,385 B2 | 9/2009 | Vayssiere | |
| 7,679,534 B2 | 3/2010 | Kay et al. | |
| 7,805,492 B1* | 9/2010 | Thatcher | G06F 16/3326 709/206 |
| 7,890,526 B1 | 2/2011 | Brewer et al. | |
| 7,958,151 B2* | 6/2011 | Basner | G06F 15/16 707/790 |
| 8,036,878 B2 | 10/2011 | Assadollahi | |
| 8,726,165 B1 | 5/2014 | Phillips et al. | |
| 9,143,573 B2* | 9/2015 | Barak | G06F 3/04842 |
| 9,235,842 B2* | 1/2016 | Kramer | G06Q 30/0214 |
| 9,244,905 B2* | 1/2016 | Joshi | G06F 40/274 |
| 10,909,156 B2* | 2/2021 | Lin | G06F 16/337 |
| 2004/0053605 A1 | 3/2004 | Martyn et al. | |
| 2004/0133561 A1 | 7/2004 | Burke | |
| 2005/0108344 A1 | 5/2005 | Tafoya et al. | |
| 2005/0131888 A1 | 6/2005 | Tafoya et al. | |
| 2005/0198144 A1 | 9/2005 | Kraenzel et al. | |
| 2006/0004843 A1 | 1/2006 | Tafoya et al. | |
| 2006/0129929 A1 | 6/2006 | Weber et al. | |
| 2006/0242109 A1 | 10/2006 | Pereira et al. | |
| 2006/0247915 A1 | 11/2006 | Bradford et al. | |
| 2007/0050352 A1 | 3/2007 | Kim | |
| 2007/0050728 A1 | 3/2007 | Vayssiere | |
| 2007/0055922 A1 | 3/2007 | Martynov et al. | |
| 2007/0100890 A1 | 5/2007 | Kim | |
| 2008/0126983 A1 | 5/2008 | Keohane et al. | |
| 2008/0222256 A1 | 9/2008 | Rosenberg et al. | |
| 2009/0077026 A1* | 3/2009 | Yanagihara | G06Q 10/107 |
| 2009/0077494 A1* | 3/2009 | Sjolin | G06F 40/274 715/764 |
| 2009/0119581 A1 | 5/2009 | Velusamy | |
| 2009/0192786 A1 | 7/2009 | Assadollahi | |
| 2009/0193334 A1* | 7/2009 | Assadollahi | G06F 40/274 707/999.005 |
| 2009/0287680 A1 | 11/2009 | Paek et al. | |
| 2011/0154193 A1 | 6/2011 | Creutz et al. | |
| 2013/0227031 A1* | 8/2013 | Wells | H04L 51/48 709/206 |
| 2018/0232441 A1* | 8/2018 | Lin | G06N 20/00 |
| 2023/0394040 A1* | 12/2023 | Gupta | G06F 16/285 |

OTHER PUBLICATIONS

Windows Help Central; "Migrating Outlook Autocomplete to Another Computer"; Feb. 1, 2009; Retrieved from: https://www.windows-help-central.com/outlook-autocomplete.html; 4 pages.
Office Action dated Apr. 1, 2011; U.S. Appl. No. 12/394,873, filed Feb. 27, 2009; 13 pages.
Final Office Action dated Sep. 16, 2011; U.S. Appl. No. 12/394,873, filed Feb. 27, 2009; 10 pages.
Office Action dated Jul. 31, 2014; U.S. Appl. No. 12/394,873, filed Feb. 27, 2009; 12 pages.
Office Action dated Feb. 26, 2015; U.S. Appl. No. 12/394,873, filed Feb. 27, 2009; 15 pages.
Final Office Action dated Sep. 2, 2015; U.S. Appl. No. 12/394,873, filed Feb. 27, 2009; 17 pages.
Advisory Action dated Dec. 3, 2015; U.S. Appl. No. 12/394,873, filed Feb. 27, 2009; 3 pages.
Office Action dated Oct. 7, 2016; U.S. Appl. No. 12/394,873, filed Feb. 27, 2009; 14 pages.
Final Office Action dated Feb. 10, 2017; U.S. Appl. No. 12/394,873, filed Feb. 27, 2009; 16 pages.
Advisory Action dated Apr. 28, 2017; U.S. Appl. No. 12/394,873, filed Feb. 27, 2009; 4 pages.
Office Action dated Oct. 4, 2017; U.S. Appl. No. 12/394,873, filed Feb. 27, 2009; 15 pages.
Final Office Action dated May 17, 2018; U.S. Appl. No. 12/394,873, filed Feb. 27, 2009; 17 pages.
Notice of Allowance dated Aug. 29, 2018; U.S. Appl. No. 12/394,873, filed Feb. 27, 2009; 16 pages.

* cited by examiner

SYSTEM AND METHOD FOR IMPROVED ADDRESS ENTRY

CROSS-REFERENCE TO RELATED APPLICATIONS

This application is a continuation of and claims priority from prior U.S. patent application Ser. No. 12/394,873 filed on Feb. 27, 2009, now U.S. Pat. No. 10,176,162; the entire disclosure is herein incorporated by reference in its entirety.

FIELD OF THE TECHNOLOGY

The present disclosure relates generally to the field of electronic communications and particularly to a system and method for improved address entry.

BACKGROUND

Electronic communications require address information to properly direct a communication from a sender to a recipient via an electronic communications network. Such a network typically processes a literal address (such as, but not necessarily, an email address) to resolve the intended destination of the communication. The electronic communication application of the communication's sender can typically accept alternative forms of address information, for example as either a literal email address or as a person's name, the name being associated, by the application, with a corresponding literal email address. Hereinafter, "entering an address" means entering any form of information that the application can resolve to address information of the type that can be processed by the electronic communications network used to deliver the communication.

A sender of an electronic communication may have a large number of potential recipients from which to choose several recipients for that particular communication. It is commonplace for address information to be stored in order to be presented to the sender while the sender is choosing recipients for an electronic communication. Address information is typically stored in persistent address information lists, which may include address entries stored in contact lists (such as personal address books and global address lists, for example). Additionally, a transient address list (such as an auto-complete list, for example) can be generated, on the fly, as a relatively small list whose entries are taken from one or more persistent address information lists.

Electronic communications that can be sent to multiple recipients include email messages, Short Message Service (SMS) messages, Multimedia Message Service (MMS) messages, Instant Messaging (IM) messages, calendar invitation messages and conference telephone call messages, for example. Electronic communications may be sent from computing devices, whether wired or wireless, using communication software, as is well known in the art.

A common technique for enabling a user to specify an address in a recipient field of an electronic communication is to provide an auto-complete list, typically as a drop-down or pop-up menu of options, each option being a candidate address that the user may or may not desire to use as a recipient address. An auto-complete list behaves such that as the user inputs a portion of a recipient address, one or more persistent address information lists are searched to identify candidate addresses corresponding to the portion of the recipient address input thus far. Such an address information list can be a global address list (comprising, for example, all members of an organization, such as a corporation) or a list of addresses to which the particular user of the electronic communication application has previously (or recently) sent email; the latter type of list is more practical than a global address list if the organization has a multitude of members. Any candidate addresses, found in the one or more persistent address information lists, that correspond to the input portion of the recipient address are included in the auto-complete list. The correspondence need not be a perfect match between respective initial substrings of the currently input portion of the recipient address and of an address in a persistent address information list. For example, typing "Michael" can result in an auto-complete list being populated with options that have "Michael" as a first name, as a last name, or as a substring within the literal email address. The auto-address list enhances the productivity of the user by allowing the user to select one of the candidate addresses on the list, without having to type it out in its entirety, thereby speeding the input of a desired recipient address.

To further enhance the productivity of the user, when address information lists are used to generate an auto-complete list, the candidate addresses in the auto-complete list are typically listed in a particular order designed to allow the user to efficiently locate the desired address from amongst the candidate addresses. One well known method of ordering is alphabetical ordering. Another well known method of ordering is according to how recently the candidate addresses were input by the particular user of the of the electronic communication application. In this method, a Most-Recently Used (MRU) address list is created by displaying at the beginning (conventionally, the top) of the list the most-recently used matching address found in the persistent address information list(s), followed by less-recently used addresses in decreasing order of last use. Yet another well known method of ordering is according to how frequently the candidate addresses were used (typically during a predetermined time span prior to the present) by the particular user of the electronic communication application. In this method, a Most-Frequently Used (MFU) address list is created by displaying at the beginning (conventionally, the top) of the list the most-frequently used matching address found in the persistent address information list(s), followed by less recently used addresses in decreasing frequency of last use. MRU and MFU lists are typically generated by searching only candidate addresses previously (or recently) input by the user.

Known methods for providing an auto-complete list are typically only based on a current recipient address being entered. This can interfere with the efficient use of the list. Therefore, there is a need for an improved system and method for entering addresses.

BRIEF DESCRIPTION OF THE DRAWINGS

The accompanying drawings illustrate embodiments by way of example only. In the drawings.

DETAILED DESCRIPTION OF SAMPLE EMBODIMENTS

An improved address entry system and method are provided with reference to specific exemplary embodiments. It is to be understood that, although examples of an improved system and method for address entry are provided in the context of specific electronic communication systems, the present disclosure is equally applicable to any other electronic communications systems, as would be apparent to any person skilled in the art of electronic communications.

According to one aspect of the current disclosure, there is provided a method for address entry in an electronic communication composition application. The method comprises: detecting a first input indicative of a first recipient address; detecting, subsequent to detecting the first input, a second input indicative of at least a portion of a second recipient address; generating, based on the first recipient address, an auto-complete list comprising candidate address corresponding to the second input; and displaying the auto-complete list.

According to another aspect of the current disclosure, there is provided a device comprising a processor and, connected thereto, a memory and a display. The memory is for storing at least one address information list and computer-readable instructions for an electronic communications composition application, said instructions being executable on the processor. The application is operable for: detecting a first input indicative of a first recipient address; detecting, subsequent to detecting the first input, a second input indicative of at least a portion of a second recipient address; generating, based on the first recipient address, an auto-complete list comprising candidate address corresponding to the second input; and displaying the auto-complete list on the display.

According to another aspect of the current disclosure, there is provided a computer program product comprising a computer-readable medium storing computer-readable instructions for address entry, the computer-readable instructions comprising instructions for: detecting a first input indicative of a first recipient address; detecting, subsequent to detecting the first input, a second input indicative of at least a portion of a second recipient address; generating, based on the first recipient address, an auto-complete list comprising candidate addresses that correspond to the second input; and displaying the auto-complete list.

Figure 1:
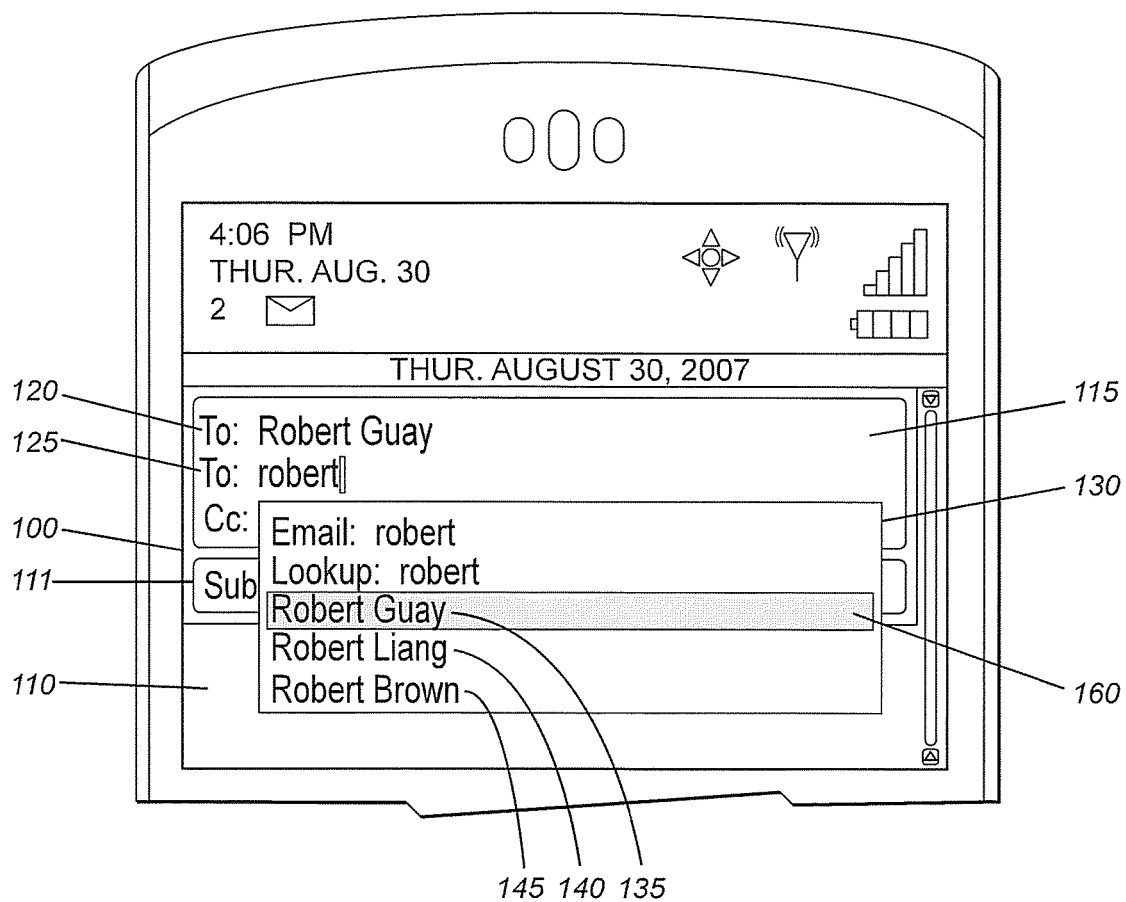
FIG. 1 shows a user interface screen for an exemplary electronic communication application featuring a conventional address entry method based on an auto-complete list.

FIG. 1 shows a user interface screen for an exemplary electronic communication application featuring a conventional address entry method based on an auto-complete list. Electronic communication composing screen 100 will be recognized by a person skilled in the art as an email composing screen for composing electronic messages, but it is to be understood that the particular type of composing screen, electronic communication application or electronic communication is not important to the present example. Electronic communication composing screen 100 includes well known user interface elements such as message body field 110, message subject field 111 and message address bar 115. Message body field 110 is a text entry field wherein a user may enter desired body text to be sent with the electronic communication. Message subject field 111 is a text entry field wherein a user may enter the desired subject text to be sent with the electronic communication.

Message address bar 115 is actually a collection of one or more text entry fields wherein the user may enter desired address information to specify to whom the electronic communication is to be sent. In the exemplary illustration of an email composing screen 100, message address bar 115 includes a first address entry field 120 for a "To" recipient and a second address entry field 125 for another "To" recipient. As is known in the art, some systems for composing an email message initially display a single "To" entry field and display an additional "To" field each time a previously displayed "To" field is determined to hold a completed recipient address entry. Some other systems for composing an email message only display a single "To" field, under all circumstances; to enter multiple recipient addresses, the sender separates successive addresses with a predetermined separator symbol, typically a comma or semicolon. It is also known to provide a "CC" entry field (shown) and/or a "BCC" entry field (not shown).

Electronic communication composing screen 100 may include similar or different user interface elements depending on the type of electronic communication. For example, if electronic communication composing screen 100 is a calendar invitation composing screen, user interface elements included in a typical calendar invitation composing screen, such as date, time, and location fields, are included. As another example, if electronic communication composing screen 100 is a conference telephone-call composing screen, user interface elements included in a typical conference telephone-call composing screen, such as a call button, are included.

Message address bar 115 allows a user to specify address information of one or more intended recipients of an electronic communication. Depending on the type of electronic communication being composed, the user will specify appropriate address information in message address bar 115. For example, if a user is composing an email, the user enters one or more email addresses and/or address entry names which can each be resolved to a respective email address. As another example, if a user is composing an SMS message, the user enters one or more telephone numbers and/or address entry names which each can be resolved to a respective telephone number. An address entry name is resolved by correlating the entered address entry name with address information stored in address information lists. As is well known in the art, in an email application, an address entry name is typically displayed as a user-friendly alias for a literal email address. For example, address entry name "King Kong" may be displayed in lieu of the corresponding literal email address "BigHairyApe8675309@aol.com". For simplicity, the term "address" will hereinafter be used as a term inclusive of both "email address" and "address entry name" when in the context of composing an email.

Message address bar 115 of FIG. 1 shows that a user has already input a first recipient address "Robert Guay" in first address entry field 120. A portion of a second recipient address ("Robert Liang") has also been input in second address entry field 125; so far, only "Robert" has been input. To increase efficiency for the user to enter addresses into message address bar 115, auto-complete list 130 is displayed in proximate location to message address bar 115. Auto-complete list 130 is generated such that as the user inputs a portion of a recipient address into message address bar 115, one or more address information lists are searched to identify candidate addresses corresponding to the input portion of the recipient address. Any candidate addresses which correspond to the input portion of the recipient address are included in the auto-complete list 130. The user may select a candidate address included in auto-complete list 130 instead of inputting the remaining portion of the recipient address to speed the entry of a desired recipient address.

Many methods exist for a user to select an address entry in an auto-complete list. One such exemplary method requires the user to actuate an actuation button (for example by depressing a designated key, e.g. the Enter key on a keyboard, or by clicking a thumbwheel or a trackball on a mobile device) to select a first-listed candidate address in the auto-complete list. Another such exemplary method requires the user to navigate to a desired candidate address in the auto-complete list using a navigation mechanism (such as by depressing cursor keys on a keyboard or by rotating a thumbwheel or trackball mechanism) and then actuating an actuation button (such as by depressing an Enter key on a keyboard or by depressing a thumbwheel or trackball mechanism) to select the desired candidate address. Such methods are well known in the art, and the various embodiments described herein provide only exemplary embodiments of the methods for selecting a candidate address from an auto-complete list. Other selection methods are also possible.

As was previously mentioned, the candidate addresses that constitute the elements in an auto-complete list are ordered according to a method of ordering, such as alphabetical, MRU, or MFU ordering. All of the example embodiments described herein will be illustrated in reference to an MRU ordering. As will be understood by a skilled person, each example technique could be applied to any method of ordering.

FIG. 1 illustrates a shortcoming of conventional methods and systems for address entry that generate an auto-complete list of candidate addresses. An auto-complete list contains more than one candidate address when two or more addresses from one or more persistent address information lists correspond with a partial address input. In such case, the list may contain both the desired recipient address and one previously entered. Thus, a previously entered recipient address may be re-displayed in a subsequent auto-complete list as a current recipient address is incrementally input. As can be seen in message address bar 115 of electronic communication composing screen 100, a user has already input a first recipient address "Robert Guay" as a first input in first address entry field 120. In this example, the user wishes to add a second recipient address, "Robert Liang", to message address bar 115 and begins inputting characters corresponding to this recipient address into a second address entry field 125 of message address bar 115 as a second input. Upon inputting "R" into second address entry field 125 in message address bar 115, auto-complete list 130 is generated, in an exemplary MRL order, so as to include all candidate address entries, found in address information lists, that correspond to the input "R". As the user inputs more characters into second recipient address, the auto-complete list is generated to include only the candidate addresses that correspond to the currently input portion of the second recipient address. As shown in FIG. 1, the user has input characters to form the address portion "Robert" of the second recipient address ("Robert Liang"). Auto-complete list 130 is generated and includes all candidate address entries, found in address information lists, that correspond to the second input ("Robert") that forms a portion of the second recipient address ("Robert Liang"). Auto-complete list 130 includes first-listed candidate address entry 135 that matches the first recipient address ("Robert Guay"), second-listed candidate address entry 140 that matches desired second (but not yet entered/selected) recipient address ("Robert Liang") that the user is beginning to enter in second address entry field 125, and third candidate address 145. First candidate address 135 of auto-complete list 130 contains first recipient address 120 ("Robert Guay") which is already specified in message address bar 115. Second candidate address 140 contains the desired second recipient address ("Robert Liang") which is to be input in second address entry field 125. Third candidate address 145 ("Robert Brown") represents one or more other addresses which may be in the auto-complete list.

In this conventional example, the top candidate address entry in the auto-complete list is highlighted for selection by default. This is represented by selection highlight bar 160. One problem with this approach is that the inclusion of first address entry 135 as the first (or top) entry in auto-complete list 130 and its identification (e.g. highlighting) for selection by default requires the user to go through additional steps to select the desired second candidate address 140. More specifically, because the first recipient address is included in auto-complete list 130 at a location above the desired second candidate address 140, the user cannot directly actuate an actuation button to select desired second candidate address in auto-complete list 130. Further, the user must navigate past first candidate address 135 to reach desired second candidate address 140 in auto-complete list 130 using a navigation mechanism and then actuate an actuation button to select second candidate address 140. Alternatively, the user must continue to input characters until second recipient address ("Robert Liang") includes sufficient information to generate an auto-complete list which either begins with or contains only a candidate address corresponding to desired second recipient address ("Robert Liang"), at which point the user can actuate an actuation button to select that first-listed or lone candidate address. Either approach forces the user to go through additional steps and effort to select a candidate address corresponding to the desired second recipient address. In the context of a mobile computing device, where power is at a premium, this requires more time with the device is an active mode, thereby draining additional power from a battery of the device.

An improved address entry method and system has been realized through an understanding of the nature of a message address bar and an examination of user interactions therewith. A message address bar ultimately contains a listing of address entries to which an electronic communication is to be sent. It has been observed in practice that once a user has added a first recipient address to a message address bar, he or she is unlikely to add another instance of the same recipient address to the message address bar. This observed behaviour can be explained as follows: The user knows that if the first recipient address appears in the message address bar once, adding another instance of the first recipient address to the message address bar has either no technical effect (because duplicate instances of the first recipient address are amalgamated and only one copy of the electronic communication is sent to the first recipient address, as is the case with email) or an atypical technical effect (viz., the electronic communication message is sent to the first recipient address multiple times, as is the case with SMS). Combining these observations of user behaviour with the understanding of the nature of a message address bar, an improved address entry method and system may be realized as shown and described herein.

Figure 2:
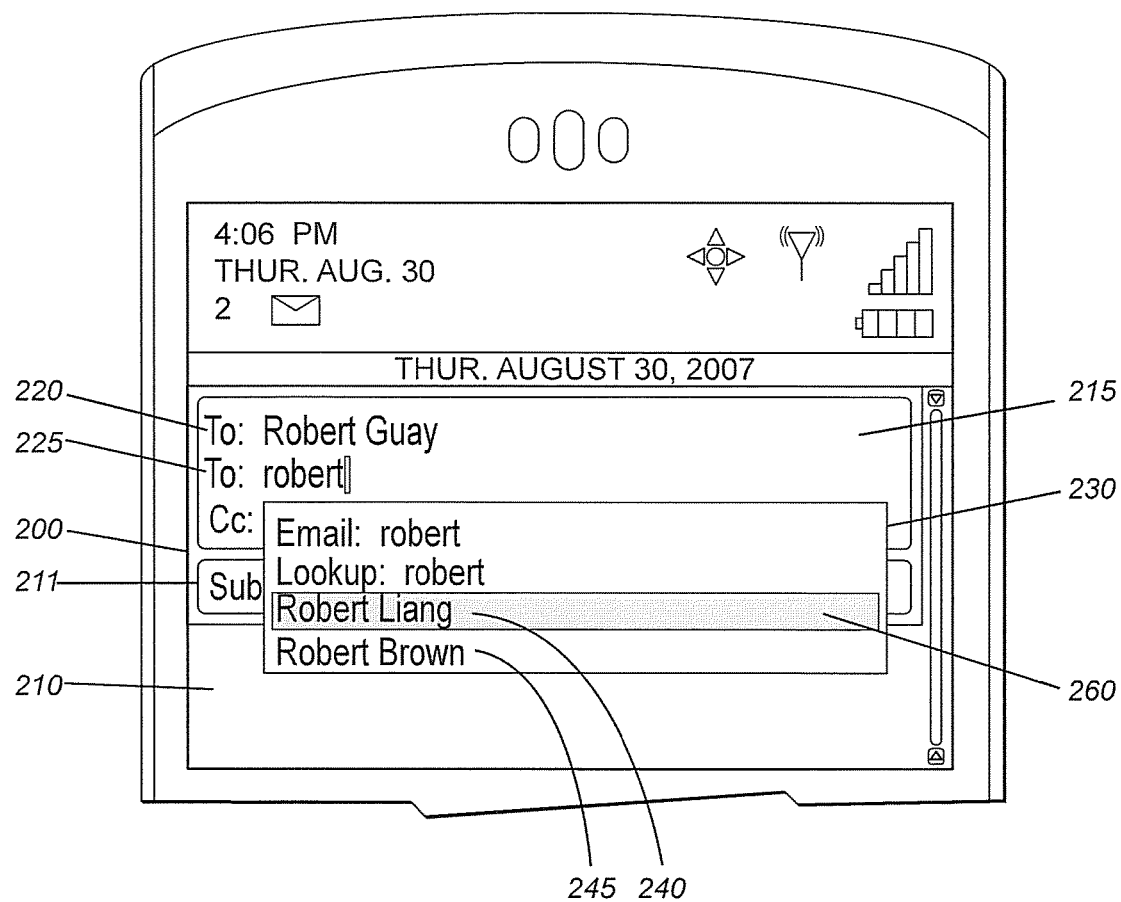
FIG. 2 shows a user interface screen for an exemplary electronic communication application featuring an address entry method in accordance with the system and method described herein.

FIG. 2 shows a user interface screen for an exemplary electronic communication application featuring an address entry method in accordance with the system and method described herein. FIG. 2 shows an electronic communication composing screen 200 which is functionally similar to electronic communication composing screen 100 as shown in FIG. 1. Electronic communication composing screen 200 includes well known user interface elements previously described in relation to FIG. 1, including message body field 210, message subject field 211 and message address bar 215. As can be seen in this example, the user has entered a first recipient address ("Robert Guay") in first address entry field 220 within message address bar 215 of electronic communication composing screen 200. In this example, the user wishes to add a second recipient address ("Robert Liang") to message address bar 215, and begins inputting characters corresponding to this recipient address into message address bar 215, as a second input, in second address entry field 225. As shown in FIG. 2, the user has input characters to form address portion "Robert" into second address 225. Auto-complete list 230 is generated and it includes candidate addresses found in address information lists which correspond to the second input, address portion "Robert".

As can be seen in FIG. 2, auto-complete list 230 includes desired second candidate address ("Robert Liang"), and other candidate address 245 ("Robert Brown"), each of which includes the second input, address portion "Robert". Auto-complete list 230, however, does not include the candidate address corresponding to first recipient address ("Robert Guay") because the first recipient address is already present in message address bar 215. The exclusion, from auto-complete list 230, of an entry corresponding to the first recipient address enables the user to quickly and efficiently select the desired second recipient address. In this example, the desired second recipient address ("Robert Liang") appears as the first-listed candidate address in auto-complete list 230 and as such, is identified or highlighted for selection by default as shown by the highlighted selection bar 260. Therefore, the user can directly actuate an actuation button to select desired second recipient address ("Robert Liang") as first-listed candidate address 240 in auto-complete list 230. By removing a candidate address that corresponds to first recipient address ("Robert Guay"), the user need not navigate past that candidate address—as was the case in reference to FIG. 1—to desired candidate address 240 in auto-complete list 230. In the context of a mobile computing device, where power is at a premium, this reduces time during which the device is an active mode, thereby reducing power drain.

As a result, functionality provided by message address bar 215 in coordination with auto-complete list 230 eases user entry of multiple recipient addresses based on the assumption that repeated entries of the same address is not likely or intended. In this example, entry of addresses is improved such that the user is saved effort (looking, navigating, actuating etc) because candidate addresses corresponding to addresses which have already been entered in message address bar 215 do not show up in auto-complete list 230.

Figure 3:
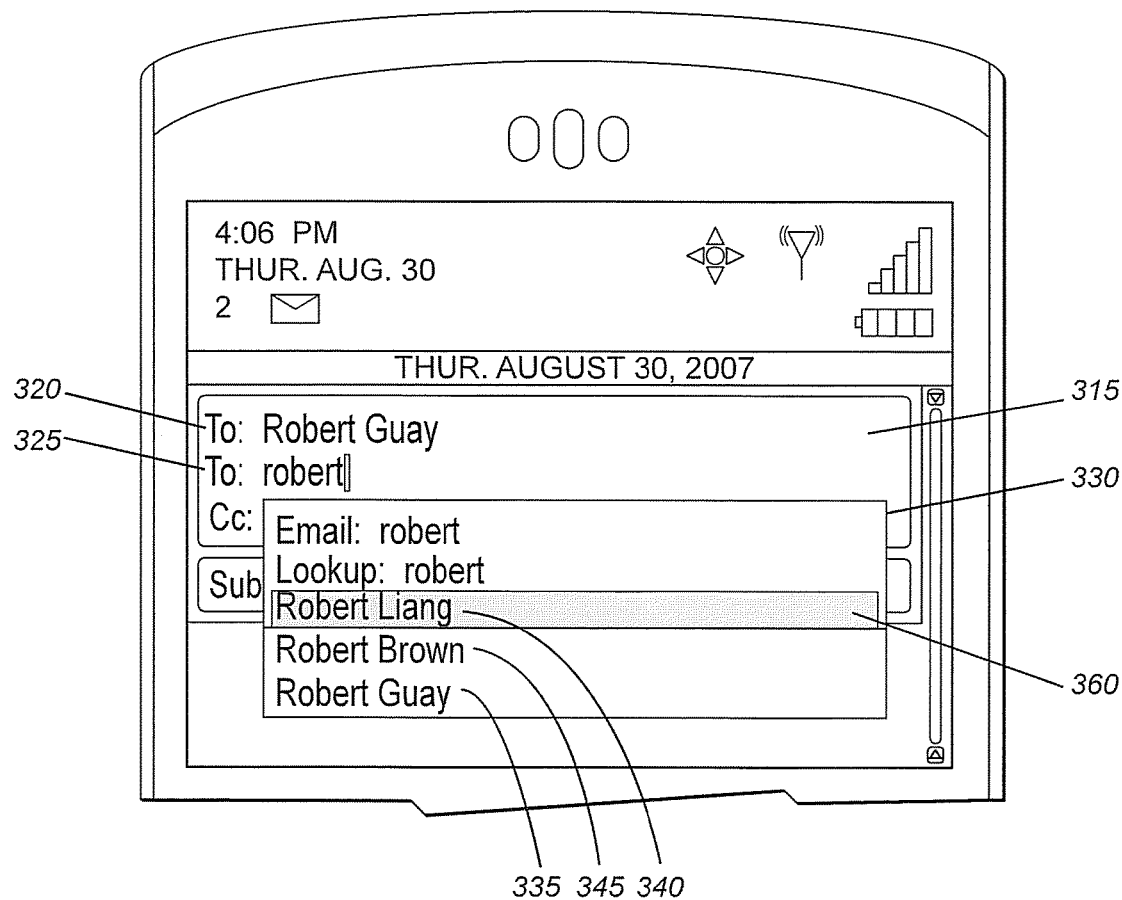
FIG. 3 shows a user interface screen for an exemplary electronic communication application featuring another address entry method in accordance with the system and method described herein.

Reference is now made to FIG. 3, which shows a user interface screen for an exemplary electronic communication application featuring another address selection method in accordance with the system and method described herein. FIG. 3 depicts an electronic communication composing screen 300 which is functionally similar to electronic communication composing screen 100 as shown in FIG. 1. Electronic communication composing screen 300 includes well known user interface elements previously described in relation to FIG. 1, including message body field 310, message subject field 311 and message address bar 315. In this alternate method, once a first recipient address has been entered into first address entry field 320 in message address bar 315, any portion of a second recipient address input as a second input in second address entry field 325 in message address bar 315 causes the generation of auto-complete list 330. The generated auto-complete list 330 contains the desired second recipient address ("Robert Liang") as first-listed candidate address 340, first recipient address ("Robert Guay") as last-listed candidate address 335, and other candidate address 345. In this example, the candidate address (335) corresponding to first recipient address ("Robert Guay") is placed at the bottom of auto-complete list 330. Desired second recipient address ("Robert Liang") corresponds to first-listed candidate address 340 and is therefore highlighted for selection by default, as indicated by the highlighted selection bar 360. As such, the user need not navigate past candidate address entry 335—as was the case in reference to FIG. 1—and can directly select desired candidate address 340 by using an actuation button. In this example, entry of addresses is also improved such that the user is saved effort (looking, navigating, actuating etc.) because recipient addresses which have already been entered in message address bar 315 are placed at the bottom of auto-complete list 330. In the context of a mobile computing device, where power is at a premium, this reduces time during which the device is an active mode, thereby reducing power drain.

Figure 4:
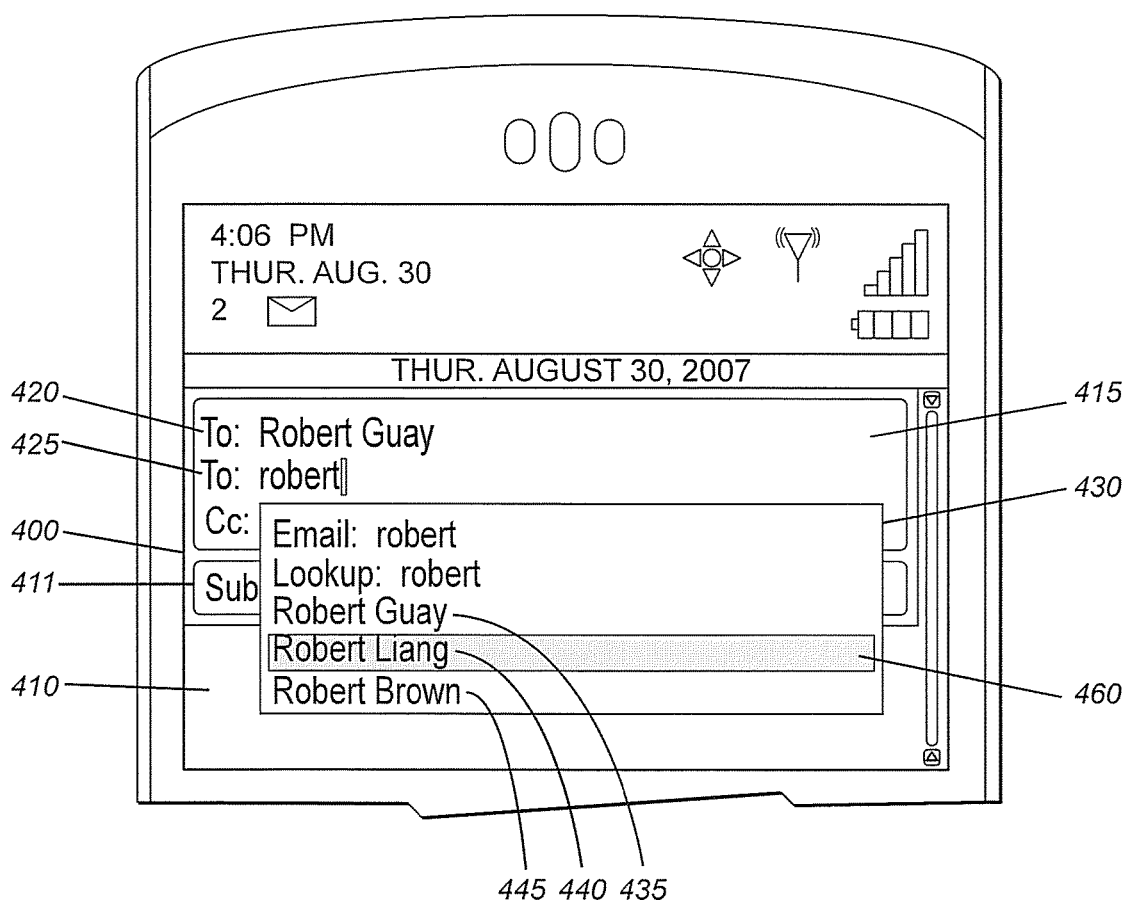
FIG. 4 shows a user interface screen for an exemplary electronic communication application featuring yet another address entry method in accordance with the system and method described herein.

Reference is now made to FIG. 4, which shows a screen for an exemplary electronic communication application featuring yet another address selection method in accordance with the system and method described herein. FIG. 4 depicts an electronic communication composing screen 400 which is functionally similar to electronic communication composing screen 100 as shown in FIG. 1. Electronic communication composing screen 400 includes well known user interface elements previously described in relation to FIG. 1, including message body field 410, message subject field 411 and message address bar 415.

In this alternate embodiment, the first-listed candidate address 435 corresponds to the first recipient address already entered in first address entry field 420. Yet, in contrast to the embodiments previously described in reference to FIGS. 2 and 3, this problematic candidate address is kept at the beginning (or top) of auto-complete list 430. However, the highlighted selection bar 460 is applied to the second candidate address entry 440 (which, coincidentally, corresponds to the desired second recipient address), as opposed to the first candidate address entry 435 as would conventionally be the case. This change in the default candidate address is to facilitate selection, by default, of a candidate address that is more likely to be needed than one already entered. More specifically, once a first recipient address ("Robert Guay") has been entered into message address bar 415, any portion of a second recipient address input into second address entry field 425 in message address bar 415 generates an auto-complete list 430. In this example, because that first candidate address 435 is likely not the desired second recipient address, the next candidate address (440) in the list is made the default selection which, in this case, happens to be desired second recipient address. This is indicated by the highlighted selection bar 460. This makes (coincidentally desired) second candidate address 440 selectable via an actuation without the need for any navigation on part of the user. In this example, entry of addresses is improved such that the user is saved effort (looking, navigating, actuating etc.) because the first address entry which has already been entered in message address bar 415 is not indicated or highlighted as the default entry for selection from auto-complete list 430. In the context of a mobile computing device, where power is at a premium, this reduces time during which the device is an active mode, thereby reducing power drain.

FIGS. 1 through 4 used as an example an electronic communication application on a portable device. However, it should be apparent to one skilled in the art that the embodiments described herein also apply to non-portable communications or computing devices. For example, the method described in FIG. 3 can also be illustrated using an electronic communication application on a desktop computer as shown in FIG. 5.

Figure 5:
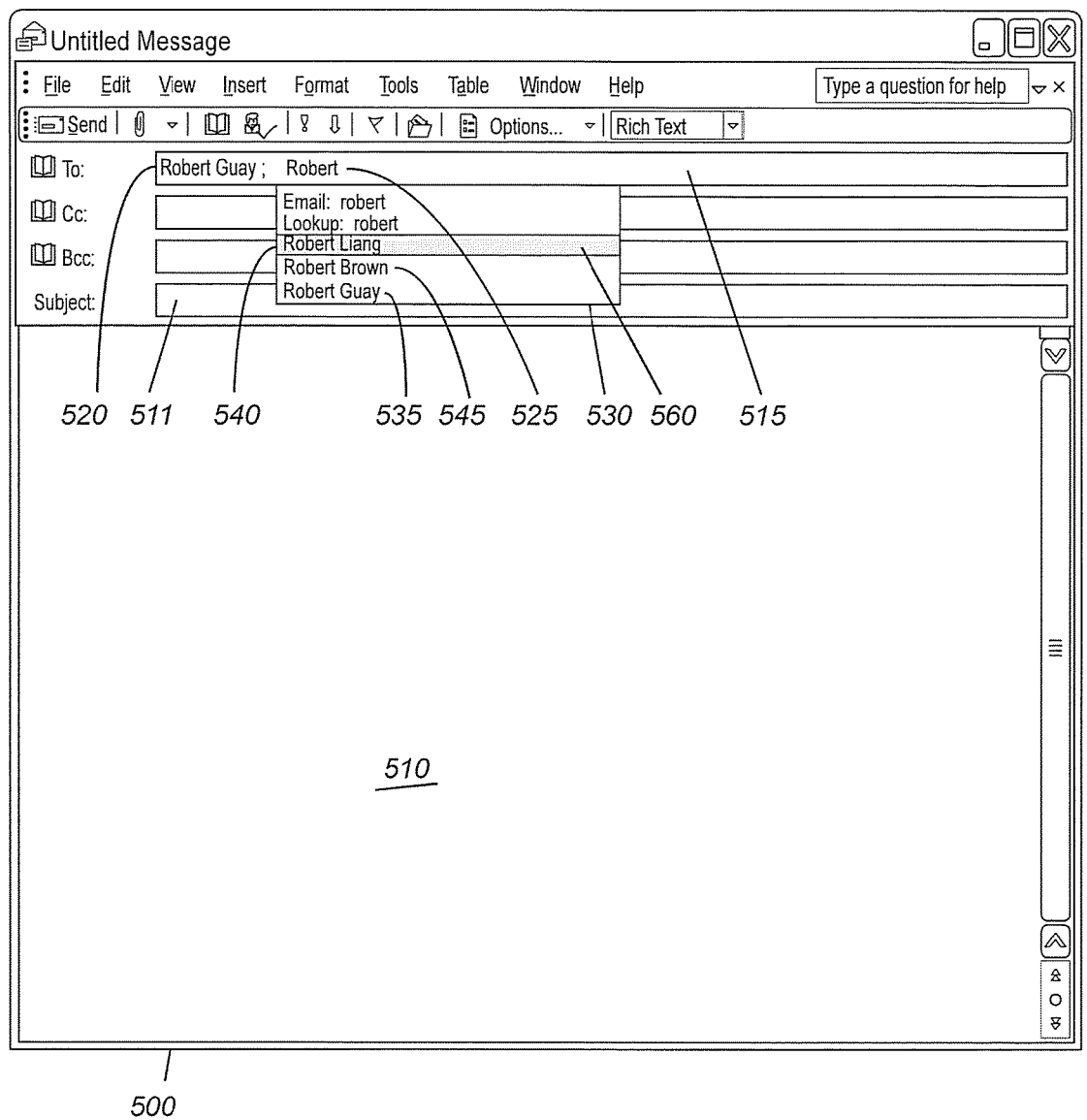
FIG. 5 shows a user interface screen for an exemplary desktop computer electronic communication application featuring the address entry method described in FIG. 3.

FIG. 5 shows a user interface screen for an exemplary desktop computer electronic communication application featuring the address selection method described in FIG. 3. FIG. 5 depicts an electronic communication composing screen 500 including well known user interface elements such message body field 510, message subject field 511, and message address bar 515. Message address bar 515 differs from corresponding message address bars of FIGS. 1 to 4 in that only a single "To" entry field, in which multiple recipient addresses can be entered, separated (in this example) by semi-colons. This example shows that the user has entered a first input, namely first recipient address ("Robert Guay") 520 followed by the recipient-separator character (";") as well as a second input, namely a portion ("Robert") 525 of desired second recipient address ("Robert Liang"). As the user inputs a portion (525) of the second recipient address, an auto-complete list 530 is generated which contains first-listed candidate address 540 that corresponds to desired second candidate address ("Robert Liang"), last-listed candidate address 535 corresponding to the first recipient address, and other candidate address 545. Candidate address entry 535 corresponds to the first recipient address ("Robert Guay") and is therefore (as in reference to FIG. 3) placed at the bottom of auto-complete list 530. As such the user can easily select candidate address entry 540 (which happens to be the desired second recipient address) by using an actuation button without having to navigate passed the first address entry 535. In the context of a mobile computing device, where power is at a premium, this reduces time during which the device is an active mode, thereby reducing power drain.

Figure 6:
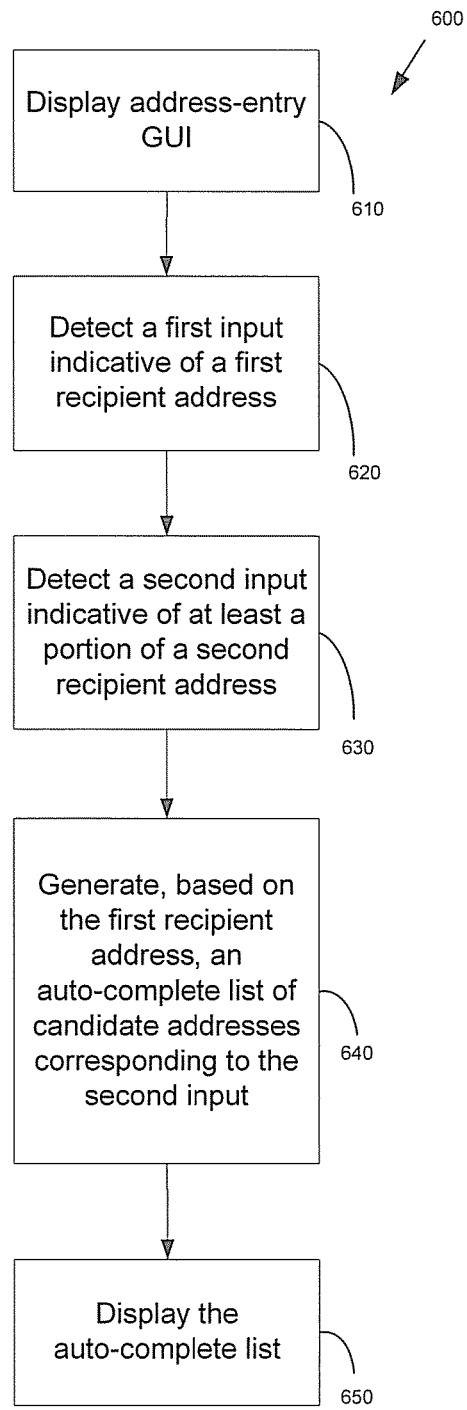
FIG. 6 is a flowchart outlining an exemplary process for an address entry method described herein.

FIG. 6 is a flowchart outlining an exemplary process for entering a second recipient address subsequent to entering a first recipient address. At step 610, a graphical user interface (GUI) is displayed for allowing a user to enter one or more addresses in an electronic communication composing application. Conventionally, one or more address entry text fields are provided for this purpose, as shown in FIGS. 1 to 5 and discussed in relation thereto. At step 620, a first input, indicative of a first recipient address for an electronic communication being composed is detected. The entering of the first input can be finalized by, for example, the detection of a finalization input, by which the user signals to the electronic communication composing application that the inputting of the first recipient address has been completed. The finalization input can be an actuation, such as the depression of a designated key (e.g., an Enter key), trackball, or thumbwheel. Alternatively, the finalization may be a shift in focus by the user, say, to enter data in another text field. As yet another alternative, the finalization input can be a selection, by the user, of a candidate address from an auto-complete list (as described above) generated in response to an input of at least a portion of the first recipient address. In some embodiments, such as the embodiment described in relation to FIG. 5 (in which there is only a single "To" entry field), another alternative is the detection of a pre-determined character, typically a comma or semi-colon, used as a recipient-separator; as soon as such a recipient-separator is detected, the first input is determined to be completed, and input of a second input is now anticipated.

Continuing in reference to FIG. 6, if the message is to be sent to more than one recipient, then a second recipient address may be input. As a second input indicative of a portion of the second recipient address is detected at step 630, an auto-complete list is generated at step 640. As in known methods for address entry, the auto-complete list will comprise addresses in one or more persistent address information lists that correspond to the portion of the second recipient address detected so far. The candidate addresses will typically be ordered according to some ordering system that aids the user in finding the desired candidate entry, such as an alphabetical ordering, a MRU ordering, or an MFU ordering. But unlike in known methods of address entry, the auto-complete list will be generated to include a list of candidate addresses corresponding to the second input, with the candidate address list being additionally based on consideration of the first recipient address, which has already been entered and likely does not need to be entered a second time. Example embodiments, illustrating various ways of performing step 640, will be described in reference to FIGS. 7 to 9 shortly.

Lastly, at step 650, the address-entry GUI will display the auto-complete list in conjunction with (and typically proximate) the address entry field in which the second input was detected.

It should be noted that where more than two addresses are to be entered, steps 630 to 650 may be repeated, as will be made explicit in the flowcharts of FIGS. 7 to 9.

Figure 7:
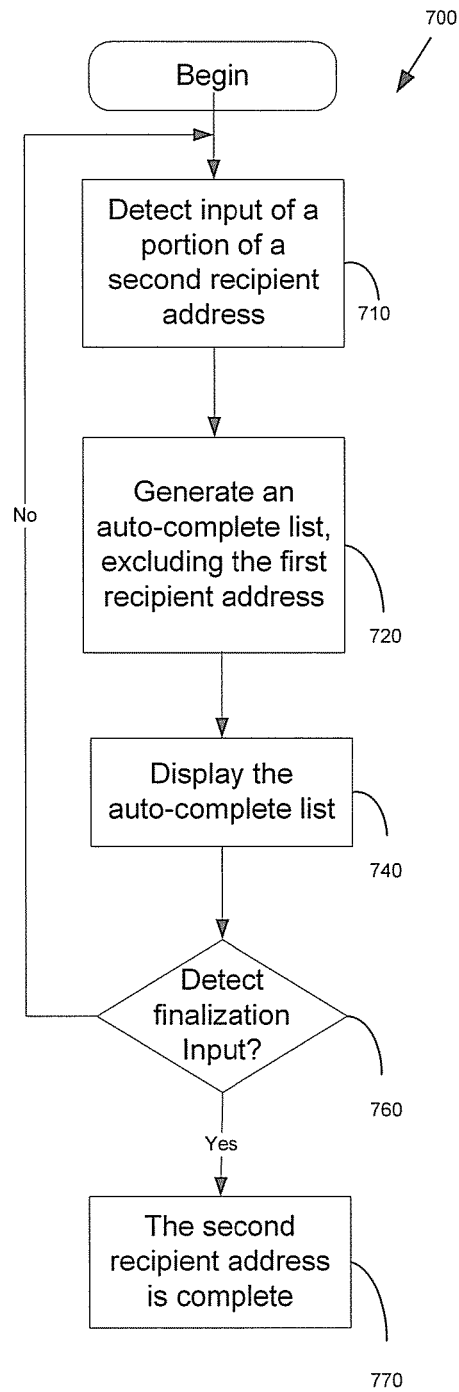
FIG. 7 is a flowchart for an exemplary process for address entry in accordance with the method illustrated in FIG. 2.

FIG. 7 is a flowchart for the exemplary process for address entry previously described herein in reference to FIG. 2. Method 700 shows the details of one possible embodiment of steps 630 to 650 in FIG. 6. Subsequent to detecting a first input indicative of a first recipient address (as at described in reference to step 620 in FIG. 6), at step 710, at least a portion of a second recipient address is input by a user into an address entry field of an electronic communication composition application and this second input is detected at the electronic device. At step 720, an auto-complete list is generated comprising candidate addresses corresponding to the second input (i.e., the portion of the second recipient address input into the address entry field thus far), but, advantageously, any candidate address corresponding to the first recipient address (input at step 620 in FIG. 6) is excluded from the auto-complete list. At step 740, the auto-complete list is displayed to the user so that the user may select a candidate address from the list to speed input of the second recipient address. In this exemplary embodiment, the list lacks any candidate address that had previously been entered, thereby eliminating the need to scroll off of or past such an unnecessary candidate address. In the context of a mobile device, where power is at a premium, saving the user time reduces the time the device must be kept in an active mode and, therefore, reduces the power drain on a battery of the device.

At step 760, the user may enter a finalization input such as selecting a highlighted address entry from the auto-complete list or proceeding to complete other fields of the electronic communication composing screen. If at 760, the user continues to interact with the address entry field by adding to, deleting from, or changing the characters previously detected at step 710 as the second input, indicative of the second recipient address, then the process goes back to step 710; the further input is detected as a newly modified second input, resulting in a possibly updated auto-complete list being generated and displayed at steps 720 to 740 based on the portion—newly modified—of the second recipient address formed by the input characters. If a finalization input was detected at step 760, then the process goes to step 770, where entry of the second recipient address is considered complete.

Figure 8:
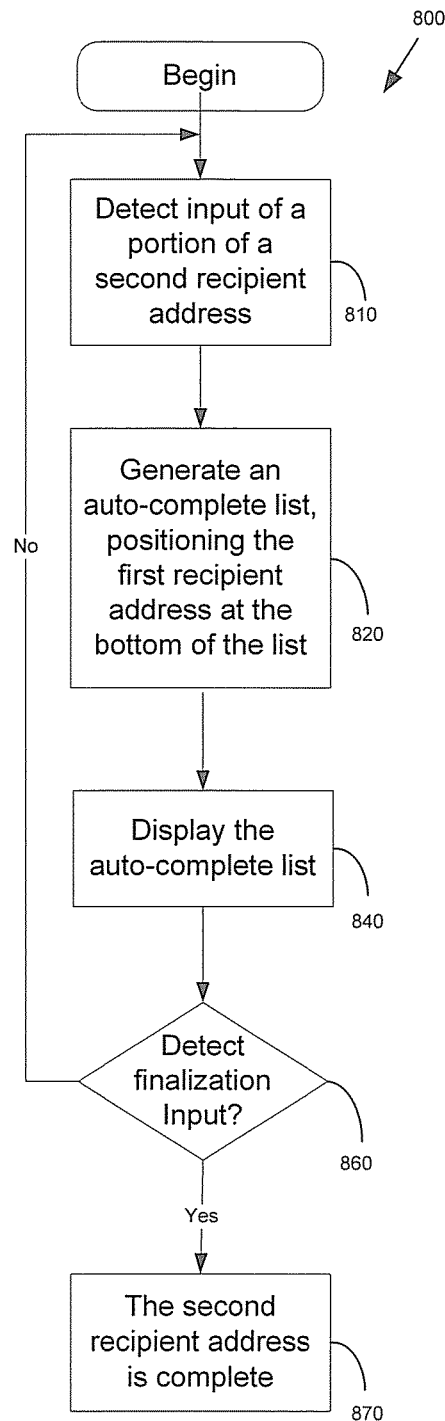
FIG. 8 is a flowchart for another exemplary process for address entry in accordance with the method illustrated in FIGS. 3 and 5.

FIG. 8 is a flowchart for the exemplary process for address entry in accordance with the system and method previously described herein in reference to FIGS. 3 and 5. Method 800 shows the details of another possible embodiment of steps 630 to 650 in FIG. 6. Steps 810 and 840 to 870 are identical to steps 710 and 740 to 770, respectively, in FIG. 7. At step 820 the auto-complete list is generated so that, advantageously, any candidate address corresponding to the first recipient address (input at 620 from FIG. 6) is positioned at the bottom of the auto-complete list. As is known in the art, it is conventional when displaying a menu of options (such as an auto-complete list of candidate addresses) to have a default option, which is typically the top-most option; a simple actuation (as discussed before) would then select the default option. In this embodiment, positioning at the bottom of the list any candidate address found to correspond to the first recipient address makes that bottom-dwelling candidate address less convenient to navigate to, as it is deemed less likely to be needed. Yet the user still has the option to choose it. In this exemplary embodiment, any candidate address that had previously been entered is positioned (e.g. at the bottom of the list) to allow faster selection of other candidate addresses. Such a candidate address is still available in case the user would want to select it for a second time. In the context of a mobile device, where power is at a premium, saving the user time in selecting candidate addresses reduces the time the device must be kept in an active mode and, therefore, reduces the power drain on a battery of the device.

Figure 9:
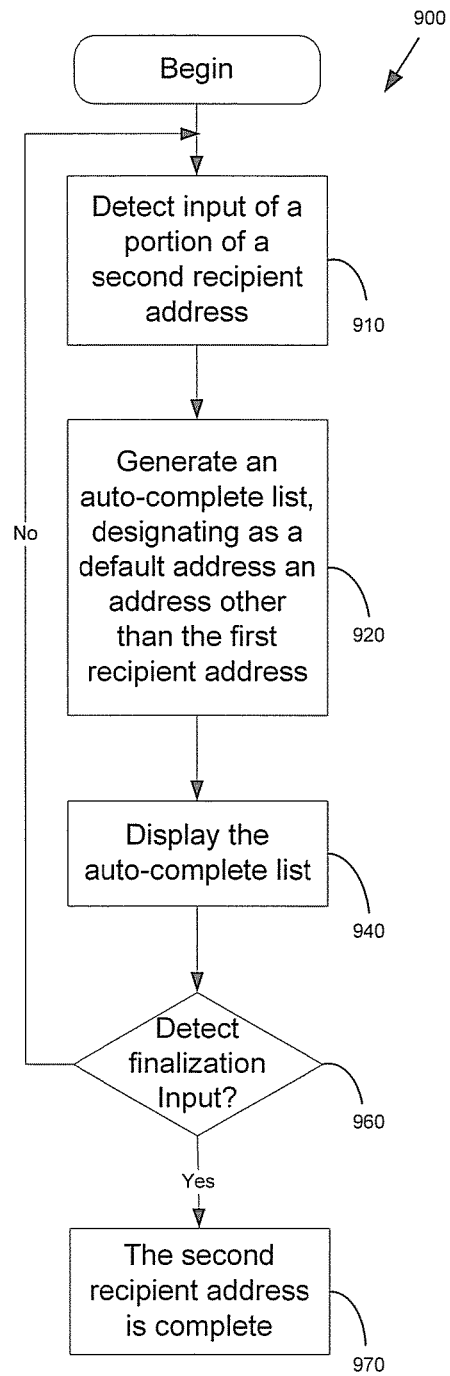
FIG. 9 is a flowchart for yet another exemplary process for address entry in accordance with the method illustrated in FIG. 4.

FIG. 9 is a flowchart for the exemplary process for address entry in accordance with the system and method previously described herein in reference to FIG. 4. Method 900 shows the details of yet another possible embodiment of steps 630 to 650 in FIG. 6. Steps 910 and 970 are identical to steps 710 and 770, respectively, in FIG. 7. At step 920, the generation of an auto-complete list explicitly includes designating a default candidate address in the list that, advantageously, is a candidate address other than any candidate address that corresponds to the first recipient address. For example, if the first-listed candidate address happens to correspond to the first recipient address, the second-listed candidate address can be designated as the default candidate address, contrary to the conventional approach of designating the first-listed candidate address as the default one.

Continuing in reference to FIG. 9, at step 940, the auto-complete list is displayed having an indication—such as a highlight, underline, or the like—so that the user is made aware that a simple actuation will result in selection of that default candidate address (for example, the second-listed candidate address in the example just described). In this exemplary embodiment, any candidate address that had previously been entered is prohibited from being the default candidate address when the auto-complete list is first displayed. The user can still navigate to and select such a candidate address if needed. In the context of a mobile device, where power is at a premium, saving the user time in selecting candidate addresses reduces the time the device must be kept in an active mode and, therefore, reduces the power drain on a battery of the device.

The foregoing examples are meant to provide a skilled reader with the detailed information required to practice an improved system and method for address entry. The improved system and method are, by no means, limited in scope to the presented embodiments, but are defined by the claims attached hereto.

What is claimed is:

1. An electronic computing device enabled for electronic communication, the electronic computing device comprising:
   a processor;
   a memory, connected to the processor; and
   computer-readable instructions stored in the memory that when executed cause the processor to perform operations comprising:
      receiving a first user input indicative of a first recipient for an electronic communication, wherein the first recipient comprises a first name and a last name;
   while the electronic communication is currently addressed to the first recipient:
      receiving, subsequent to receiving the first user input, a second user input in addition to the first recipient, the second user input being indicative of a portion of a second recipient for the electronic communication; and
      displaying an auto-complete list of one or more suggested recipients that correspond to the second user input, wherein the one or more suggested recipients are individual candidate addresses that are selected for inclusion within the auto-complete list independent of each other, and
      wherein displaying the auto-complete list comprises:
         determining the portion of the second recipient at least partially matches the first recipient, and
         responsive to the determining, displaying the auto-complete list without the first recipient being included as the one or more suggested recipients.

2. The electronic computing device of claim 1, wherein the operations further comprise:
   designating a suggested recipient in the auto-complete list that is different from the first recipient as a default suggested recipient.

3. The electronic computing device of claim 1, wherein the one or more suggested recipients are displayed as individually selectable recipients within the auto-complete list.

4. The electronic computing device of claim 1, wherein the one or more suggested recipients are immediately selectable from the auto-complete list.

5. The electronic computing device of claim 1, wherein the operations further comprise:

automatically highlighting one of the one or more suggested recipients in the auto-complete list as a default suggested recipient.

6. The electronic computing device of claim 5, wherein the one of the one or more suggested recipients that has been automatically highlighted is below a first suggested recipient in the auto-complete list.

* * * * *